(12) United States Patent
Noonan

(10) Patent No.: US 10,529,153 B2
(45) Date of Patent: Jan. 7, 2020

(54) ACCESS CONTROL AND SMART DELIVERY OF PRODUCT INFORMATION

(71) Applicant: Johnson Controls Technology Company, Auburn Hills, MI (US)

(72) Inventor: Christopher Noonan, Conna (IE)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/028,155

(22) Filed: Jul. 5, 2018

(65) Prior Publication Data

US 2019/0012857 A1 Jan. 10, 2019

Related U.S. Application Data

(60) Provisional application No. 62/528,726, filed on Jul. 5, 2017, provisional application No. 62/680,805, filed on Jun. 5, 2018.

(51) Int. Cl.
| | |
|---|---|
| *G07C 9/00* | (2006.01) |
| *G06K 19/06* | (2006.01) |
| *H04L 12/28* | (2006.01) |
| *H04W 4/33* | (2018.01) |
| *G06Q 10/00* | (2012.01) |

(52) U.S. Cl.
CPC .... *G07C 9/00111* (2013.01); *G06K 19/06009* (2013.01); *G06Q 10/20* (2013.01); *H04L 12/2827* (2013.01); *H04W 4/33* (2018.02)

(58) Field of Classification Search
CPC ............. G06K 19/06009; G06Q 10/20; G07C 9/00111; H04L 12/2827; H04W 4/33
See application file for complete search history.

(56) References Cited

U.S. PATENT DOCUMENTS

| | | | |
|---|---|---|---|
| 2002/0022984 A1* | 2/2002 | Daniel | G06Q 10/06 705/7.13 |
| 2003/0160698 A1 | 8/2003 | Andreasson et al. | |
| 2011/0178977 A1 | 7/2011 | Drees | |

FOREIGN PATENT DOCUMENTS

WO     WO 02/13104     2/2002

OTHER PUBLICATIONS

Ko et al., RFID-Based Building Maintenance System, May 1, 2009, 10 pages.
The International Search Report and the Written Opinion of the International Searching Authority for International Application No. PCT/US2018/040935, dated Sep. 28, 2018, 16 pages.

* cited by examiner

*Primary Examiner* — Nader Bolourchi
(74) *Attorney, Agent, or Firm* — Foley & Lardner LLP

(57) ABSTRACT

A method for accessing information about a product. The method includes receiving identifying information, from the product, at a device via a sensor. The method further includes transmitting the identifying information to a server. Additionally, the method includes receiving a request to provide user identification data to the server at the device, and receiving the user identification data at the device. The method further includes transmitting the user identification data to the server, and accessing content related to the product based on the user identification data.

20 Claims, 13 Drawing Sheets

ACCESS CONTROL AND SMART DELIVERY OF PRODUCT INFORMATION

CROSS-REFERENCE TO RELATED APPLICATIONS

This application claims the benefit of and priority to U.S. Provisional Patent Application No. 62/528,726 filed Jul. 5, 2017 and U.S. Provisional Patent Application No. 62/680,805 filed Jun. 5, 2018, the entirety of which are incorporated by reference herein.

BACKGROUND

The present disclosure relates generally to building management systems, and more particularly to user access of product information corresponding to a building management system. A building management system (BMS) is, in general, a system of devices configured to control, monitor, and manage equipment in or around a building or building area. A BMS can include one or more HVAC devices, which control and regulate various environmental factors within a building. Generally, BMS or Building Automation System (BAS) can include many components, including controllers, actuators, switches, sensors, and the like. Access to product specific information for these components, and delivery of the information to technicians or other personnel is often desired. Many companies have a requirement to make the product documentation available to different sets of user groups while also safe-guarding it against malicious users and competitors.

SUMMARY

One implementation of the present disclosure is a method for accessing information about a product. The method includes receiving identifying information, from the product, at a device via a sensor. The method further includes transmitting the identifying information to a server. Additionally, the method includes receiving a request to provide user identification data to the server at the device, and receiving the user identification data at the device. The method further includes transmitting the user identification data to the server, and accessing content related to the product based on the user identification data.

In some embodiments, the product is a device within a building management system (BMS). Further, in some embodiments, the content related to the product includes at least one of installation instructions, data sheets, and system information.

In some embodiments, the sensor is a proximity based sensor. Further, in some embodiments, the proximity based sensor includes a near field communication (NFC) circuit in communication with a NFC tag coupled to the product.

In some embodiments, the method further includes identifying, via the sensor, at least one of a marking, a bar code, and a QR code associated with the product, the sensor including a camera. In some embodiments, the method further includes receiving the user identification data at the device via an identification card.

In some embodiments, the method further includes receiving the user identification data at the device via a personal identification number (PIN). In some embodiments, the method further includes associating the user identification data with a preferred language of a user, and displaying the content in the preferred language of the user.

Another implementation of the present disclosure is a method for accessing service information for a product. The method includes receiving, at a server, a fault code and a product identification from the product. The method further includes analyzing the received fault code to determine content related to the fault code. Additionally, the method includes determining a field agent available to service the product based on at least one of a location of the product and a skill level associated with the service based on the received fault code. Further, the method includes transmitting a notification to the field agent, the notification including an instruction to the field agent to provide an identification. The method includes receiving the identification from a device associated with the field agent, and determining if the field agent has permission to access the content. The method further includes transmitting the content to the device if the field agent has permission to access the content.

In some embodiments, the product is a device within a building management system (BMS). In some embodiments, the content includes at least one of a required tools list, a replacement parts list, a complexity level, an estimated time to service, and the location of the product.

In some embodiments, the method further includes receiving, from the device, an acceptance or rejection from the field agent prior to determining if the field agent has permission to access the content.

Another implementation of the present disclosure is a system for accessing information about a product. The system includes a device, including a sensor. The device is configured to identify a product via the sensor, and transmit unique identifying information associated with a user of the device and a request for information about the product. The system further includes a server with a database for storing product information. The server is configured to receive the request and the unique identifying information, determine content to transmit to the device based on the unique identifying information and the request, and transmit the content to the device.

In some embodiments, the sensor is a proximity based sensor. Further, in some embodiments, the proximity based sensor is a near field communication (NFC) circuit configured to communicate with an NFC tag coupled to the product.

In some embodiments, the sensor includes a camera capable of identifying at least one of a marking, a bar code, and a QR code associated with the product. Further, in some embodiments, the unique identifying information is provided to the device via an identification card. In some embodiments, the identification card includes an NFC tag associated with the identification card. Additionally, in some embodiments, the unique identifying information is inputted into the device via a personal identification number (PIN).

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

As described above, the present disclosure includes systems and methods for user access of product information. In some embodiments, the product information corresponds to a product (e.g., device) within a building management system (BMS).

Access to product specific information for BMS components, and delivery of the information to technicians or other personnel can be difficult. Many companies have a requirement to make the product documentation available to different sets of user groups while also safe-guarding it against malicious users and competitors. For example, a company that sells anti-theft systems to the retail sector may have content delivery and access requirements. The company's service personnel can require access to installation and configuration content for each product. The customer or retail store owner can require access to basic configuration and maintenance information on the products they have installed in their stores. Product information can be updated regularly, and the information accessed by the above groups must be the most recent versions. The content must be inaccessible to malicious users who wish to gain an understanding of the product and exploit a design weakness in order to steal merchandise from a store. Finally, the content must be inaccessible to competitors.

Thus, there is a need to provide user-friendly and secure mechanisms for delivering up-to-date information to a large base of mobile device users. Further, there is a need to facilitate access to information based on a user's access level. For example, the access level of a user may depend on the role of the user within the organization, which requires access to different information than other roles, such as a service person in one area may only have access to information in that field. Finally, a need exists to enable the collection of metrics that would not have been otherwise available (e.g. information views, employees looking at information, time spent looking at information, location of user, user experience info, and the like).

The present disclosure includes proximity based sensors, such as Near Field Communication (NFC) circuits. NFC circuits are components used in many mobile cellular devices, and NFC tags can be applied to a product either on a manufacturing line or during a service or install. The following systems and methods provide for improved systems and processes for installing and servicing components within an HVAC system.

Building Management System and HVAC System

Figure 1:
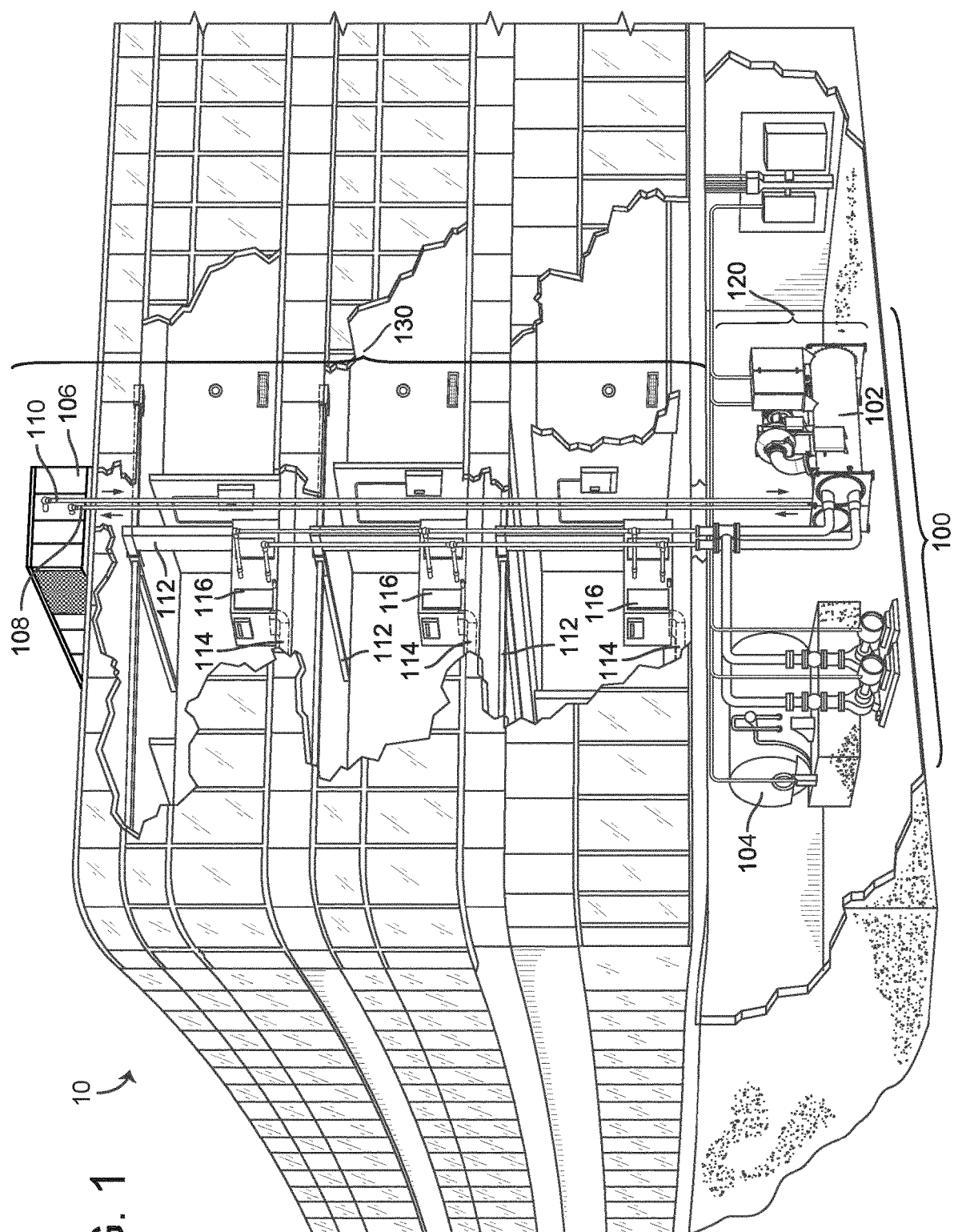
FIG. 1 is a drawing of a building equipped with a building management system (BMS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
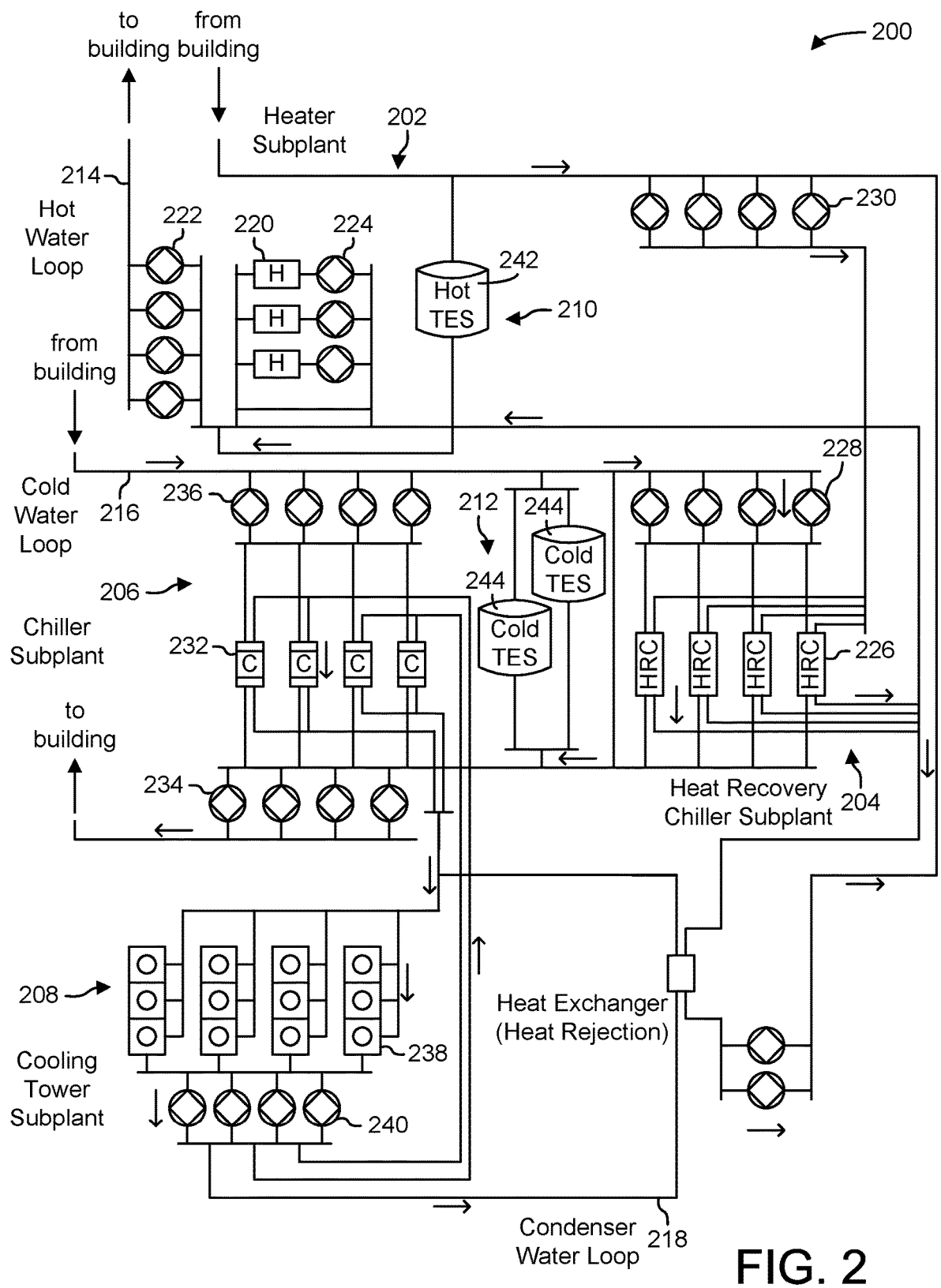
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
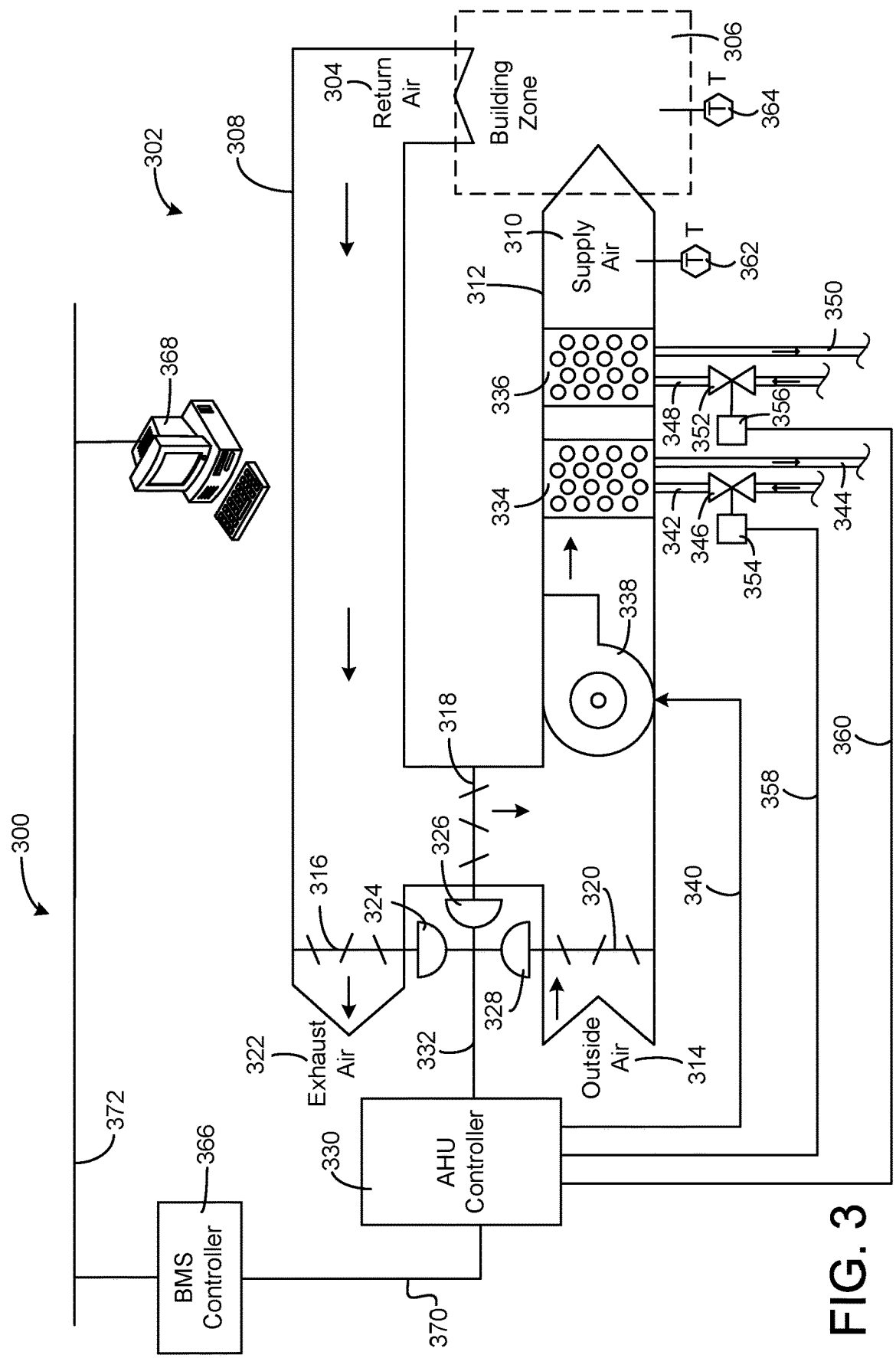
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS Controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS Controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS Controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS Controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS Controller 366 can be separate (as shown in FIG. 3) or integrated. In an integrated implementation, AHU controller 330 can be a software module configured for execution by a processor of BMS Controller 366.

In some embodiments, AHU controller 330 receives information from BMS Controller 366 (e.g., commands, setpoints, operating boundaries, etc.) and provides information to BMS Controller 366 (e.g., temperature measurements, valve or actuator positions, operating statuses, diagnostics, etc.). For example, AHU controller 330 can provide BMS Controller 366 with temperature measurements from temperature sensors 362-364, equipment on/off states, equipment operating capacities, and/or any other information that can be used by BMS Controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS Controller 366 and/or AHU controller 330 via communications link 372.

Figure 4:
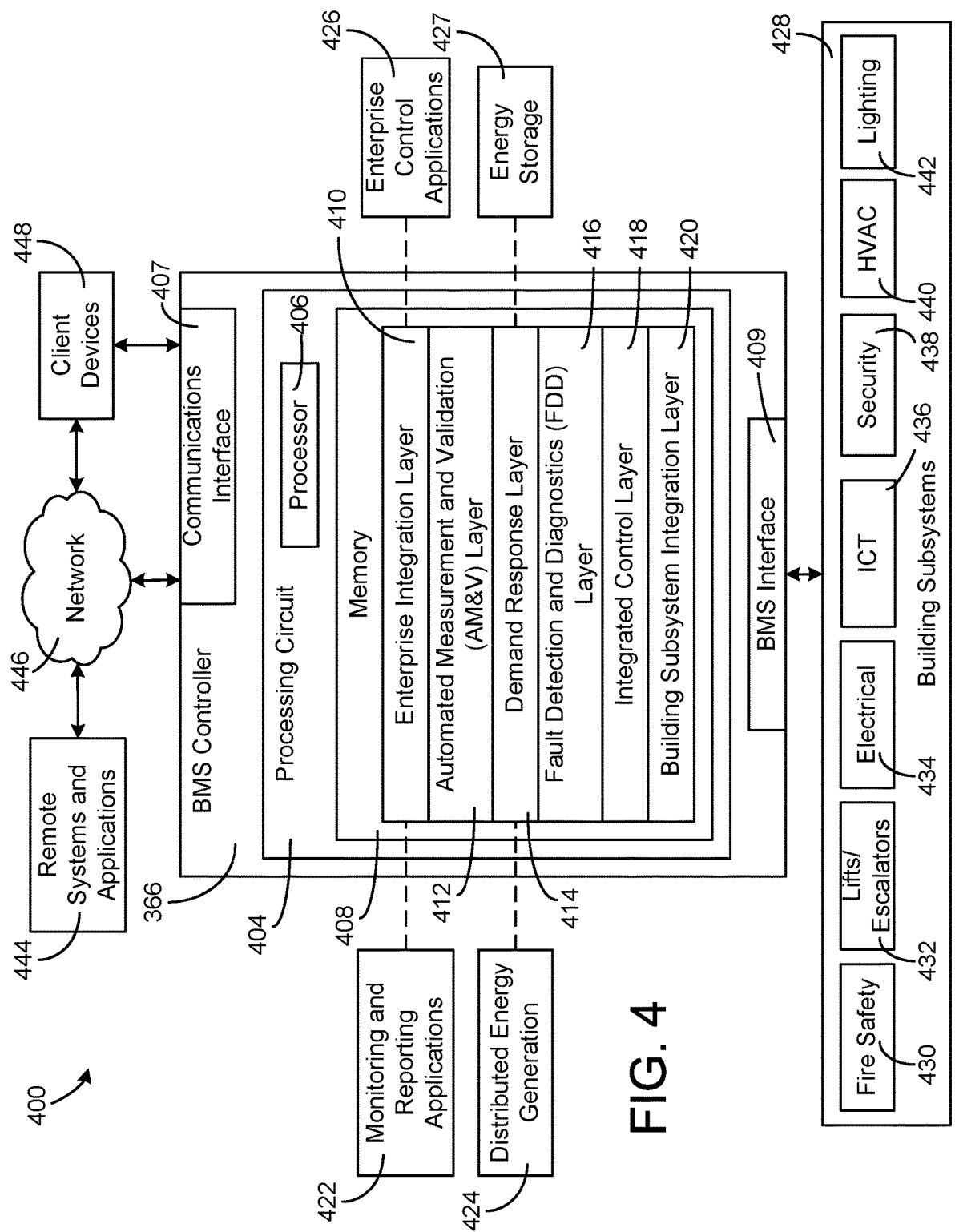
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS Controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS Controller 366 is shown to include a communications interface 407 and a BMS interface 409. Interface 407 can facilitate communications between BMS Controller 366 and external applications (e.g., monitoring and reporting applications 422, enterprise control applications 426, remote systems and applications 444, applications residing on client devices 448, etc.) for allowing user control, monitoring, and adjustment to BMS Controller 366 and/or subsystems 428. Interface 407 can also facilitate communications between BMS Controller 366 and client devices 448. BMS interface 409 can facilitate communications between BMS Controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS Controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS Controller 366 is implemented within a single computer (e.g., one server, one housing, etc.). In various other embodiments BMS Controller 366 can be distributed across multiple servers or computers (e.g., that can exist in distributed locations). Further, while FIG. 4 shows applications 422 and 426 as existing outside of BMS Controller 366, in some embodiments, applications 422 and 426 can be hosted within BMS Controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS Controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS Controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translates communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS Controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Access Control and Delivery of Product Information

Figure 5:
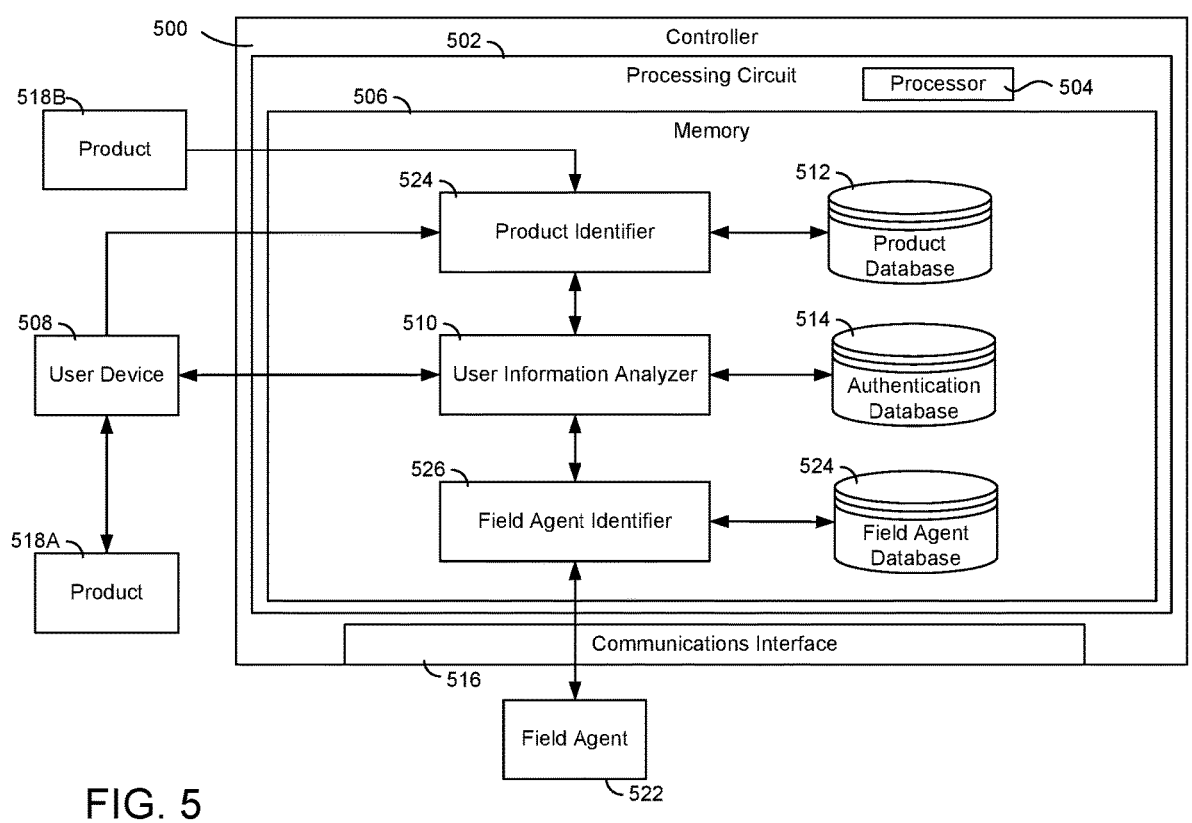
FIG. 5 is a block diagram of a controller (e.g., a server) which can be used to provide access control and product information corresponding to the BMS of FIG. 4, according to some embodiments.

Referring now to FIG. 5, a block diagram of a controller 500 configured to provide access control and delivery of production information is shown, according to some embodiments. Controller 500 can be, for example, a server. Controller 500 can have a processing circuit 502, including a processor 504, memory 506, and communications interface 516.

In some embodiments, user device 508 utilizes a sensor, such as a NFC circuit coupled to an NFC tag, or a camera, to receive identifying product information from product 518. User device 508 can be configured to transmit the product identifying information to product identifier 524, which can be configured to communicate with product database 512. Product data 512 can be configured to store content related to the product. Product identifier 524 can be configured to then send a signal to user information analyzer 510, which can be configured to request user identification data from user device 508. User device 508 can be configured to respond with information corresponding to its user. For example, the response can include a PIN, or a swipe pattern using a touch screen interface of the user device 508. User information analyzer 510 can be configured to search authentication database 514 in order to verify that the user of user device 508 is authorized to view content being requested.

In some embodiments, memory 506 can include field agent identifier 526 and/or field agent database 524. As shown, field agent 522 can provide information to field agent identifier 526. Accordingly, field agent identifier 526 can, in some embodiments, verify that field agent 522 is authorized to access information relating to product 518a, 518b. Alternatively, field agent identifier 526 can determine if field agent 522 has the skills necessary to address a product issue. In some embodiments, this can include searching field agent database 524, which can be configured to store information relating to field agent 522.

Figure 6:
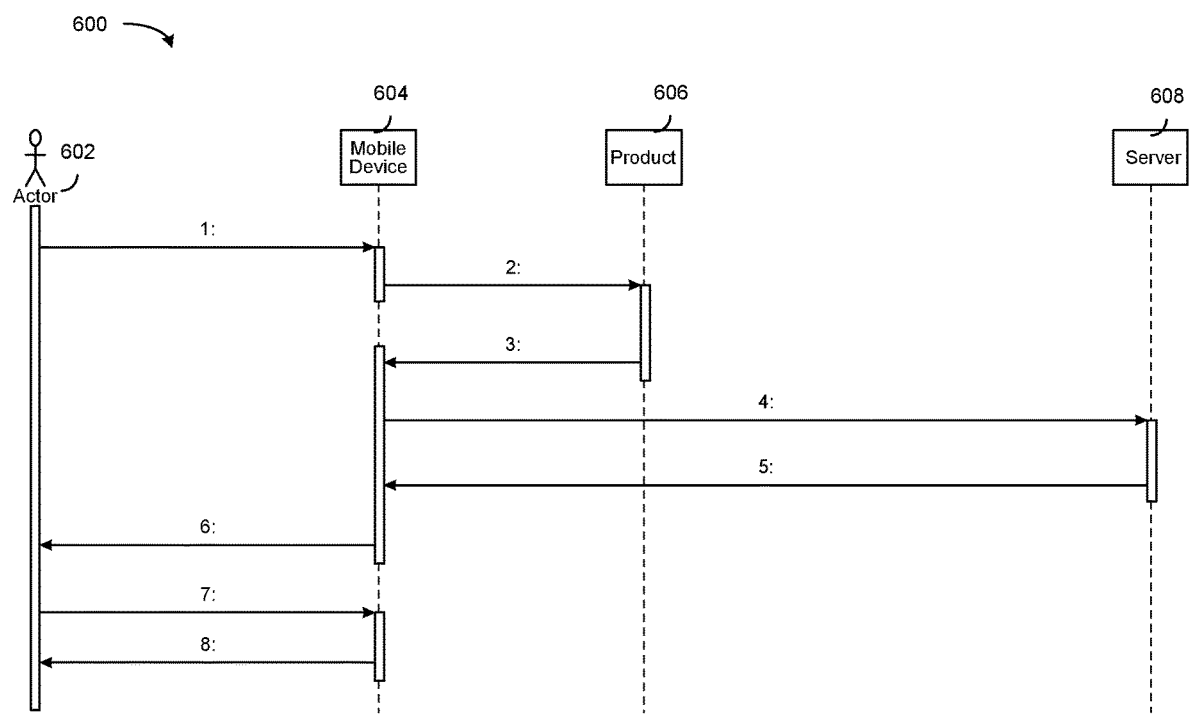
FIG. 6 is an block diagram of a process for installation and linkage to content of a new BMS device, according to some embodiments.

Referring now to FIG. 6, a block diagram of a process 600 for installation and linkage to content of a new device is shown, according to some embodiments. In some embodiments, the new device can be an actuator; however, other BMS devices, such as those described above, can also be used. Process 600 can include a user 602, a mobile device 604, a product or device 606 and a central server 608. User 602 can have an employee ID card associated with user 602. In some embodiments, the employee ID card includes an NFC circuit for communicating with other NFC circuits. Mobile device 604 can be a smartphone, a table computer, or a dedicated device for interfacing with one or more BMS components. Mobile device 604 can further include an NFC circuit for reading NFC tags, such as NFC transponders and/or NFC-based ID cards. Mobile device 604 can further include a native application ("app"). The app can utilize the NFC circuit to read NFC tags or ID cards. The app can be configured to include a framework for allowing content to be pushed, navigated, and displayed on mobile device 604. The app can also be configured to push and pull information to and from server 608. The app can be further configured to authenticate a user using a combination of the device NFC circuit, an NFC tag and an NFC employee card, as will be described in more detail below. In some embodiments, the app can be registered to one specific user at the time of installation onto the mobile device 604.

Device 606 can include an NFC tag. The NFC tag can assign an ID number to the device 606. The ID number can be associated with a corresponding ID number in server 608. The NFC tag can also create a link between the user and the content, by initiating a push event when mobile device 604 is within a predefined proximity to the NFC tag.

Server 608 can include a database of product information associated with ID numbers, such as ID numbers associated with NFC tags. The database can include information associated with an ID number of a device, such as the product location within the BMS, a model number, and service history of device 606. In one embodiment, the database can use a genealogy to bind information to relate a product ID number, fault codes, services agent location in relation to a product, and the link based on the NFC tag ID number. Server 608 can include a server side app. The server side app can be configured to query the database based on the information pushed to it from the mobile app. The server side app can further be configured to push product content to the application on mobile device 604, and push service notifications to nearby service agents working in the determined business area. For example, the server side app can push the notifications to mobile devices associated with the service agents. The server side app can further be configured to schedule and log service tasks and related information, and associated the schedules and logs with specific devices and/or systems.

As shown in FIG. 6, at step 1, user 602 interacts with mobile device 604. User 602 can interact with mobile device 604 by launching the app. At process step 2, mobile device 604 is used to scan device 606. Scanning device 606 can include touching mobile device 604 to device 606 to activate NFC communications between the NFC tag of device 606 and the NFC circuit within mobile device 604. However, in some embodiments, mobile device 604 can include a camera for imaging device 606. The camera can be used to image the device itself, or a marking on the device such as a bar code, a QR code, or other identifying information.

Once device 606 is scanned, the device 606 transmits data to mobile device 604 at process block 3. The data can include an NFC tag ID and a device ID. At process block 4, the app, via mobile device 604, makes a request to server 608 for all content relating to the scanned device 606. The content can include product IDs, fault codes, service agent locations, and the like. At process block 5, device 606 is authenticated based on the data received from the app on mobile device 604. Once the device is authenticated, the content relating to device 606 is pushed to mobile device 604. Once the data is received at the app, user 602 is prompted to scan their employee ID card at process block 7 and scans the employee ID at process block 8. In one embodiment, user 602 can scan the employee ID card using the NFC circuit on mobile device 604. In other embodiments, user 602 can use a camera or other imaging system on mobile device 604 to scan the employee ID. Once user 602 has been verified based on the scanned ID, user 602 is granted access to the content related to device 606 at process block 8.

Figure 7:
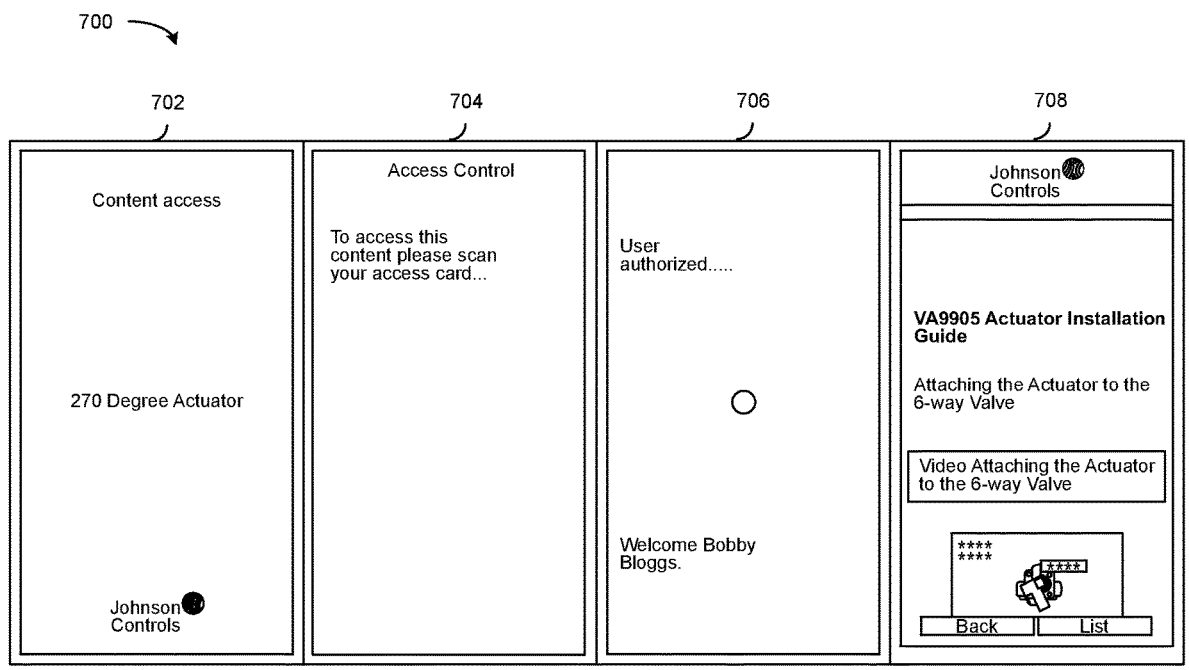
FIG. 7 is a block diagram illustrating an example installation process, according to some embodiments.

Turning now to FIG. 7, a block diagram 700 of an example installation process is shown, according to some embodiments. The installation agent can scan an NFC tag or QR code using the app on a mobile device. A product ID number can be obtained from the tag and pushed, via a wireless communication protocol, to a server, along with details about the user. Screen shot 702 illustrates a display provided by the app, indicating that the scanned device is a 270° actuator. The content can be accessed via the server-side app, and content relating to the device and the user is then sent to the user's mobile device. The user is then prompted to scan their employee ID card. As described above, the employee ID card can be scanned using the NFC circuit in the mobile device, or imaged using a imaging sensor, such as a camera, on the mobile device. In other embodiments, the user can provide other identification indicators, such as a PIN, or a swipe pattern using a touch screen interface of the mobile device. An indication to scan the user's ID card is provided via the app on the mobile device, as shown in screen shot 704. The user can be authorized based on the input provided. An indication that the user has been authorized is shown in screen shot 706. The user can then be allowed access to the content associated with the device. Based on information relating to the user, the content can be provided to the user in the appropriate language, as well as be product specific and based on their access privileges and/or job title.

An example of content that can be provided to a user for an actuator is shown in screen shot 708. Example content can include installation guides, installation videos, step by step instructions for installation, etc.

Figure 8:
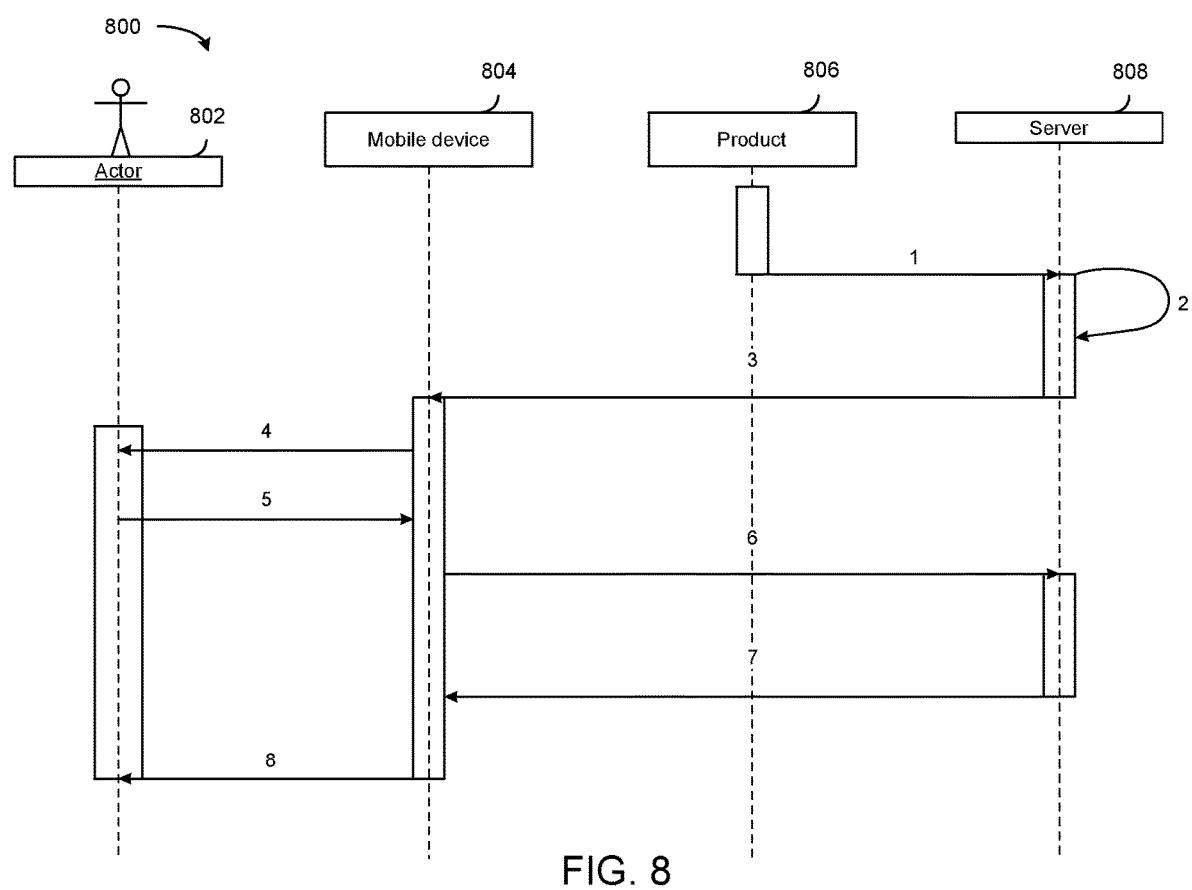
FIG. 8 is a block diagram of a device service process, according to some embodiments.

Turning now to FIG. 8, a block diagram of a device service process 800 is shown, according to some embodiments. Service process 800 can be used once a device is already installed within a BMS. The information provided to the user can be specific to the task that needs to be performed in order to service a device. The information can include required tools, product location within a BMS, potentially needed replacement parts, and maintenance instructions. The information provided can be similar to the information described in the installation process 600 above, but in this instance, the content can be provided to the user upon the device experiencing a fault, as will be described in more detail below.

In a BMS with multiple networked devices, a device can experience a fault and generate an associated error code. The device can then transmit the error code and an associated device ID to a server-side application within a server. The error code can be analyzed by the server-side application and a relating repair procedure is associated therewith. In one embodiment, the association is created by making a direct link between individual error codes and a relating repair procedure in a technical content management system. The device ID is then analyzed to determine information associated with the device, such as GPS coordinates of where the product is located, as well as the type of product. The information can then be transmitted to a user, such as a technician or agent who works in the business area associated with the faulted device. In one embodiment, the information is pushed to a mobile device of the user. Once the user receives the notification, they can either scan their employee ID, or provide identifying information before accessing content associated with the fault.

As shown in FIG. 8, process 800 relates to communication between user 802, a mobile device 804, a device 806, and a server 808. The user 802, mobile device 804, device 806 and server 808 can be similar to the user, mobile device, device and server described above in regards to FIG. 6. At process step 1, device 806 detects a fault and sends the fault code and product ID to server 808. At process step 2, server 808 assesses the fault code and prepares related content associated with the fault code and the product ID. At process step 3, server 808 pushes a notification to user 802. In one embodiment, the notification is a service request. In some embodiments, server 808 determines which user to send the notification to based on the location of the component, the type of fault, the business area of the user, and other parameters, to ensure that the proper agent is notified. At process step 4, user 802 accepts the service request.

At process step 5, user 802 is prompted to scan their employee ID card using mobile device 804, via an app on mobile device 804. Once the mobile device receives the scanned employee ID card, the ID information is transmitted to the server and analyzed by server 808 to verify the identity of user 802. In one embodiment, server 808 compares the identification information from user 802 against one or more identifiers associated with mobile device 802. In one embodiment, server 808 can compare the received data against a universally unique identifier (UUID) associated with mobile device 802. At process step 7, the content associated with the fault and device 806 is pushed to mobile device 804. User 802 then accesses the pushed content using mobile device 804 at process step 8.

Figure 9:
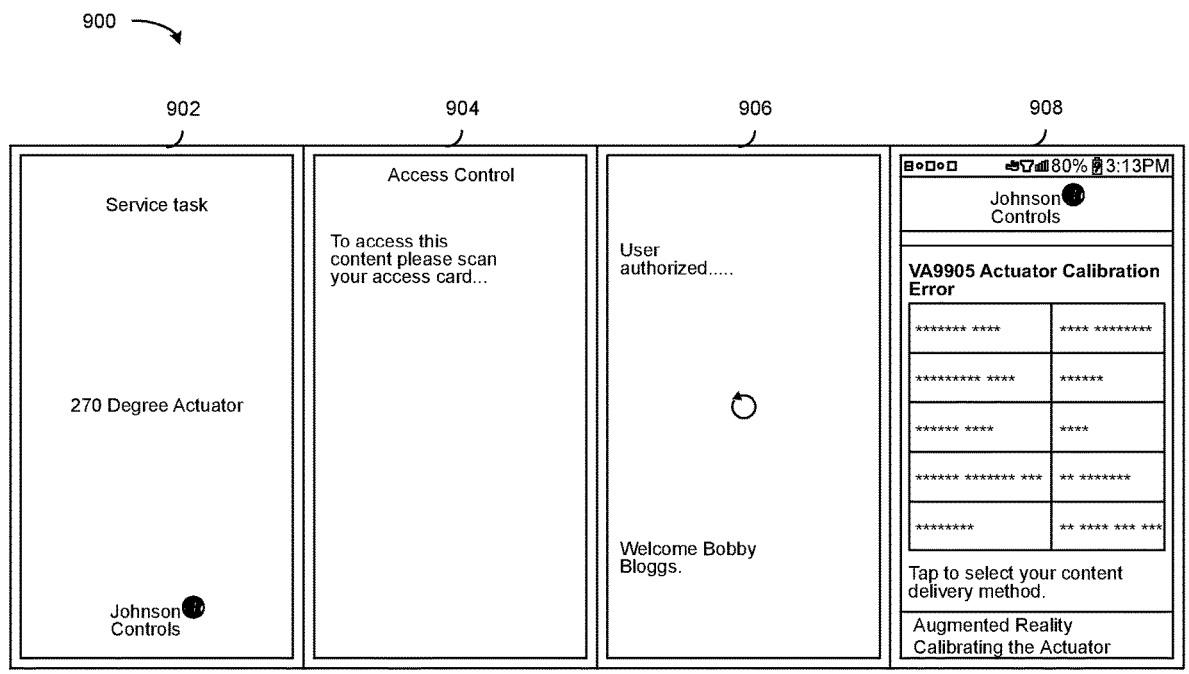
FIG. 9 is a block diagram illustrating an example installation process, according to some embodiments.

Turning now to FIG. 9, a block diagram 900 of an example installation process 900 is shown, according to some embodiments. The device can experience a fault and pushes an error code to the server. The fault is assessed against the content database, a service agent database, and an installation history database. The databases can be stored in the server. A service task is then scheduled and pushed to an appropriate nearby user. As shown in screen shot 902, an example push notification viewed via an app on the mobile device is shown, according to some embodiments. The user can be prompted to scan their ID card, such as via imaging or NFC communication with the mobile device (as shown by screen shot 904). The user can also be able to provide a PIN, present a swipe pattern using a user interface of the mobile device, or otherwise provide identifying information using the mobile device.

The user can be verified and authorized to access content associated with the service task, based on the identity of the user being verified by the server. Screen shot 906 illustrates an example indication to the user that they have been authorized. The user can be granted access to the content required to repair or correct the fault, along with additional information such as required tools, replaceable parts, repair complexity level, estimated repair time, and device location. This information can be provided to the user prior to travelling to the site. As shown in screen shot 908, an example information screen displayed via the app installed on the mobile device. The user can be able to select one or more options for desired content delivery, including PDF instructions, video instructions, audio instructions, or augmented reality instructions. The augmented reality instructions can allow the user to use a camera on the mobile device to image the faulty device. The app can then overlay instructions for completing the repair on top of the imaged device. This can allow for a user who is unfamiliar with a specific device to easily understand the required process to repair or address the fault.

Figure 10:
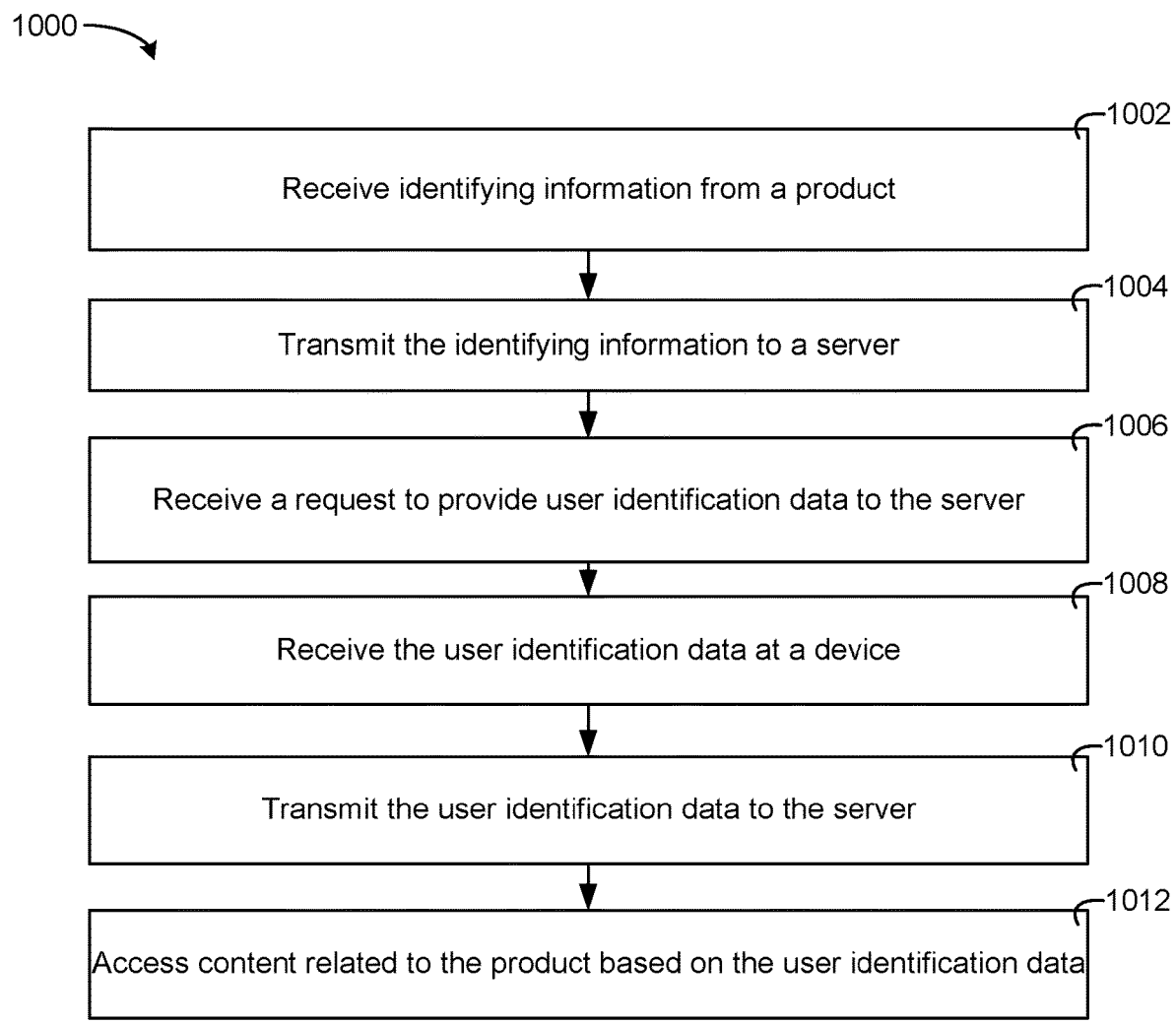
FIG. 10 is a flow chart of a process for accessing information about a product, according to some embodiments.

Turning now to FIG. 10, a flow chart of a process 1000 for accessing information about a product is shown, according to some embodiments. Process 1000 can be completed using the user device 508 and controller 500 described above, or can include other devices within the BMS. At process block 1002, a device receives identifying information from a product. For example, an NFC chip in the device can be coupled to an NFC tag in the product. At process block 1004, the identifying information is transmitted to a server. At process block 1006, a request is received to provide user identification data to the server. At process block 1008, user identification data is received at a device. The request can be received by, for example, by the user device 508. At process block 1010, the user identification data is transmitted to the server. At process block 1012, content related to the product is accessed based on the user identification data.

Figure 11:
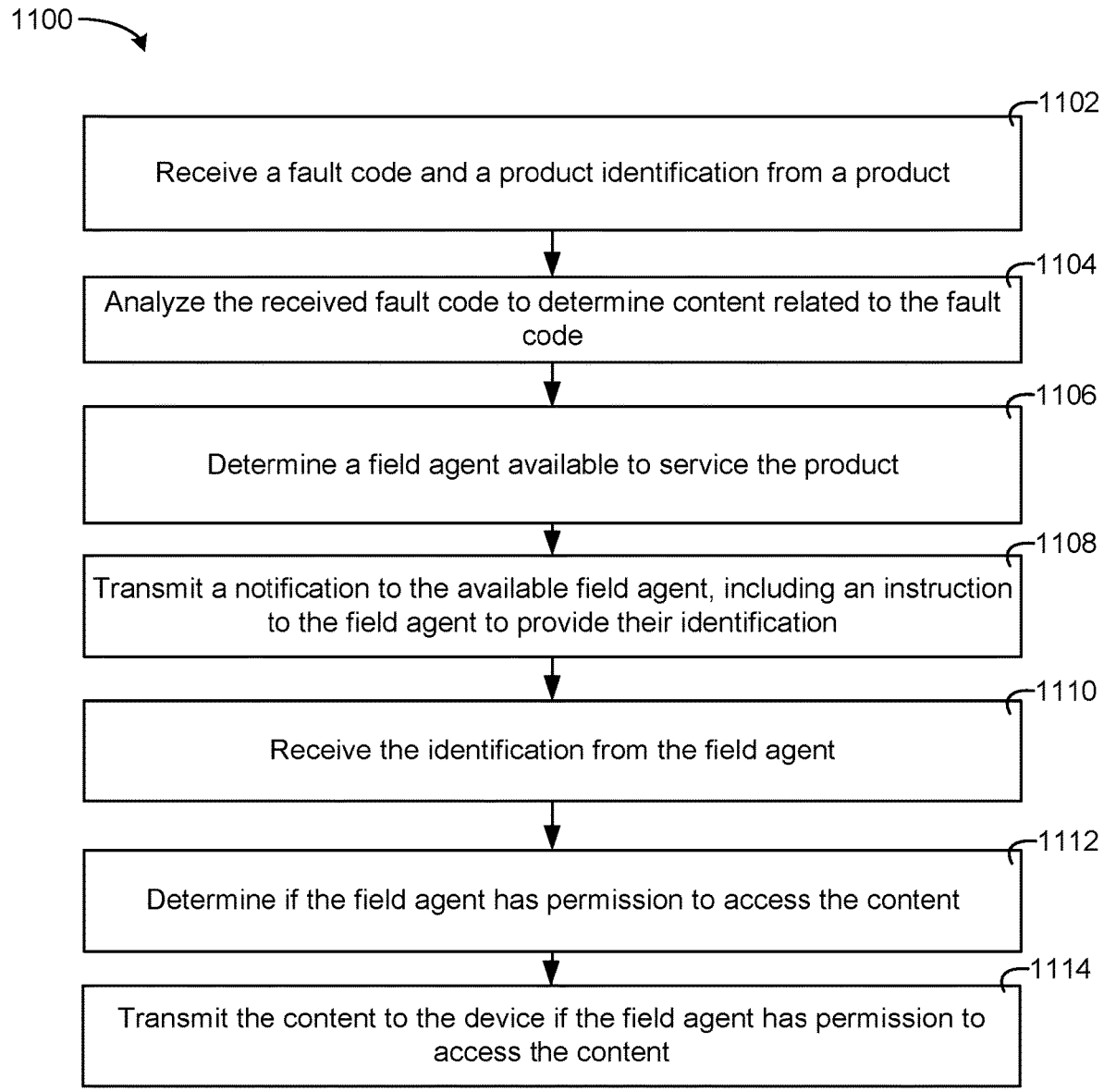
FIG. 11 is a flow chart of a process for accessing service information for a product, according to some embodiments.

Turning now to FIG. 11, a process 1100 for accessing service information for a product is shown, according to an exemplary embodiment. The process 1100 can be completed by using the user device 508 and controller 500 described above, or can include other devices within the BMS. At process block 1102, a fault code and a product identification from a product are received. At process block 1104, the received fault code is analyzed to determine content related to the fault code. At process block 1106, a determination that a field agent is available to service the product is made. At process block 1108, a notification is transmitted to the available field agent, including an instruction to the field agent to provide their identification. At process block 1110, the identification from the field agent is received. At process block 1112, a determination is made as to whether the field agent has permission to access the content. At process block 1114, the content is transmitted to the device if the field agent has permission to access the content.

Figure 12:
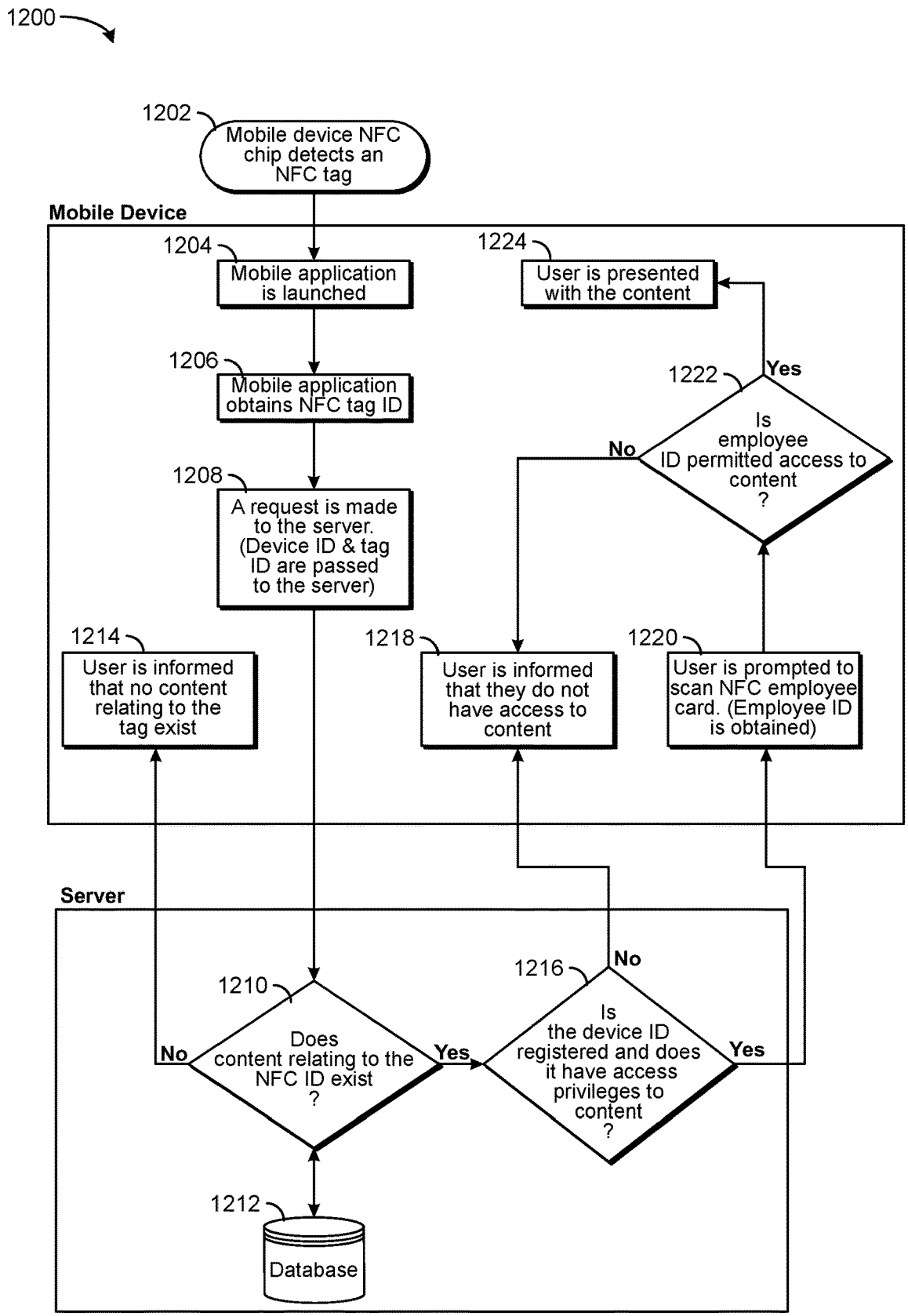
FIG. 12 is a flow chart of a process for installing and directly linking a device, according to some embodiments.

Turning now to FIG. 12, a flow chart of a process 1200 for installing and directly linking a device is shown, according to an exemplary embodiment. The process 1200 can be completed using the component described above, or can include other devices within the BMS. At process block 1202, a mobile device NFC circuit detects an NFC tag associated with a BMS device. At process block 1204, a mobile application associated with the mobile device is launched. At process block 1206, the mobile application obtains an NFC tag ID from the NFC tag. At process block 1208, a request is made to a server to obtain information related to the scanned NFC tag. In one embodiment, a device ID and NFC tag ID are passed to the server. At process block 1210, the server determines if content related to the NFC tag ID exists. In one embodiment, the server can be in communication with a database 1212. The database 1212 can include a database of NFC tag IDs that are associated with installed devices. If the server determines that no content exists related the NFC tag ID, the user is informed that no content relating to the NFC tag ID exists at process block 1214.

If the server 909 determines that content does exist that is related to the NFC tag ID, the server 909 then determines if the device ID is registered and whether the content is accessible (e.g. does the device have privileges to access the content), at process block 1216. If the device ID is not registered or permission to access the content is not available, the user is informed that they do not have access to the content at process block 1218. If the device ID is registered and there are available permissions to access the content, the user is prompted to scan an NFC employee ID card at process block 1220. In some embodiments, the user can be prompted to provide other identification information where the user does not have an NFC enabled employee ID card. Based on the provided user information, it is determined whether the employee is permitted access to the content at process block 1222. If the employee does not have access, they are informed that they do not have access to the content at process block 1218. If the employee does have access, they are presented with the content at process block 1224.

Figure 13:
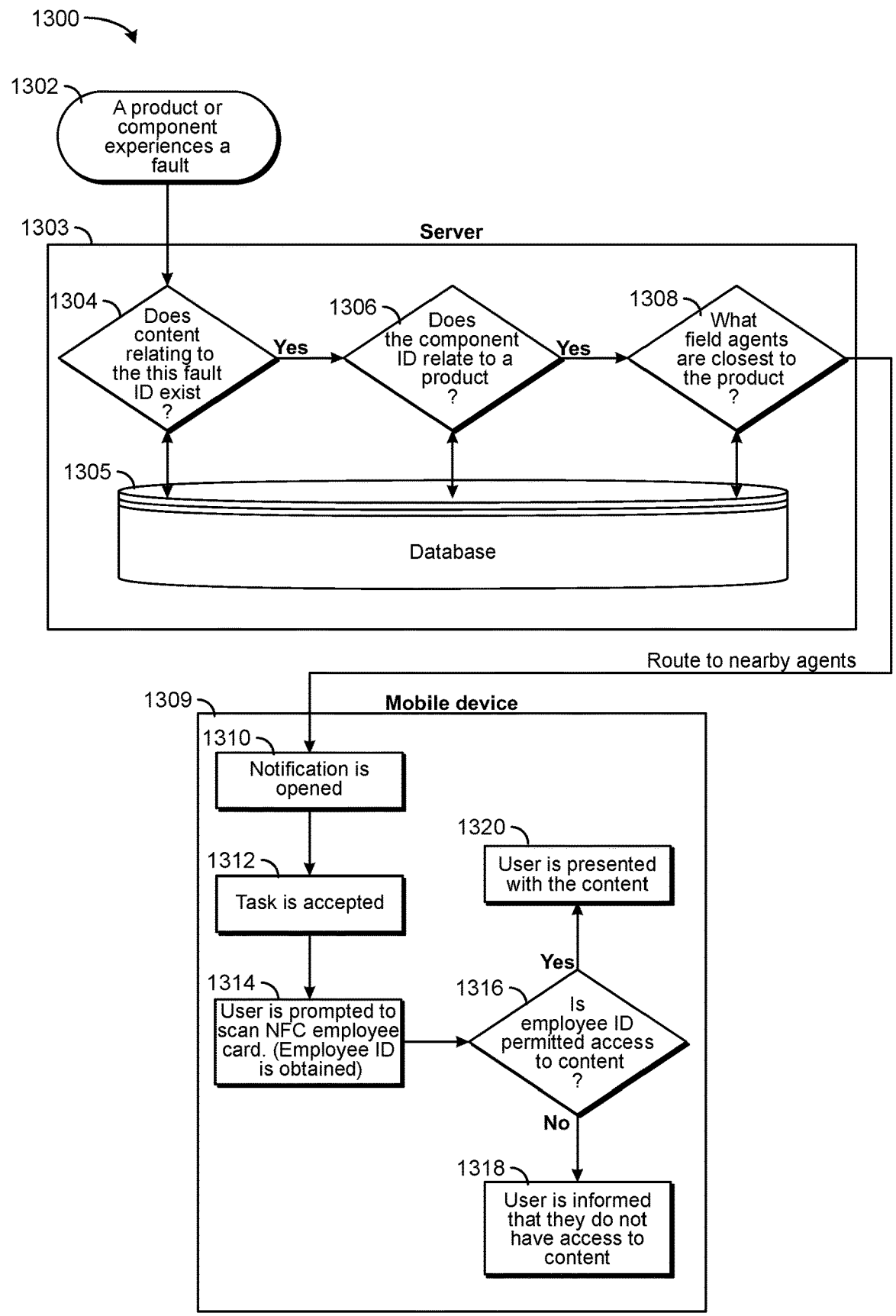
FIG. 13 is a flow chart illustrating a process for servicing a BMS device, according to some embodiments.

Turning now to FIG. 13, a flow chart of a process 1300 for servicing a device is shown, according to an exemplary embodiment. The process 1300 can be completed using the components described above, or can include other devices within the BMS. At process block 1302, a product or device experiences a fault 1302. The product can then transmit the fault (e.g. via an associated fault code) to the server 1303. At process block 1304, the server determines if content relating to the identified fault exists. In one embodiment, the server 1303 can access a database 1305. The database 1305 can include fault data, component/device data, field agent data, etc. If content relating to the fault ID exists, the server 1303 determines if the device ID relates to a known product at process block 1306. If the device ID relates to a known product, the server 1303 then determines what field agents are located closest and are capable of repairing the product at process block 1308. Once the field agent is determined at process block 1308, a notification is sent to the mobile device 1309 associated with the determined field agent. The notification is opened at process block 1310, and the task is accepted by the field agent at process block 1312. In one embodiment, the notification can be presented to the user via an application on the mobile device 1309, which allows the field agent to accept or deny the task. Once the field agent accepts the task, they are prompted to scan their NFC employee card at process block 1314. Scanning the NFC employee card can access an employee ID associated with the field agent. While the above method describes scanning an NFC employee card, other methods of providing user identification is also contemplated, including imaging the employee ID, requiring a PIN, or allowing the field agent to input other identifying information using the mobile device 1309.

At process block 1316, it is determined whether the field agent, based on the scanned ID, is permitted to access the content associated with repairing the faulted component or device. If the field agent is not permitted access to the content, the field agent is informed that they do not have access to the content at process block 1318. If the field agent is determined to have permission to access the content, the content is provided to the user at process block 1320, via the mobile device 1309.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for displaying product information associated with a building management system (BMS) component, the method comprising:
   receiving, by a sensor of a user device, identifying information, the identifying information uniquely identifying the BMS component;
   receiving, from a user of the user device, user identification verifying the user;
   transmitting the identifying information and the user identification to a server;
   receiving, from the server, based on the user identification, the product information associated with the BMS component, the product information comprising at least one of installation instructions, data sheets, or system information; and
   displaying, via the user device, the product information to the user.

2. The method of claim 1, wherein the user device is a smart phone running a mobile application.

3. The method of claim 1, the product information further comprising one of a product ID, fault codes, or service agent locations.

4. The method of claim 1, wherein the sensor is a proximity based sensor.

5. The method of claim 4, wherein the proximity based sensor comprises a near field communication (NFC) circuit in communication with a NFC tag coupled to the BMS component.

6. The method of claim 1, further comprising identifying, via the sensor, at least one of a marking, a bar code, or a QR code associated with the BMS component, the sensor comprising a camera.

7. The method of claim 1, further comprising receiving the user identification at the user device via an identification card.

8. The method of claim 1, wherein the user identification is a personal identification number (PIN).

9. The method of claim 1, further comprising:
associating the user identification with a preferred language of the user; and
displaying the product information in the preferred language of the user.

10. A method for displaying service information associated with a building management system (BMS) component, the method comprising:
receiving, from the BMS component by a server, a fault code and identifying information, the identifying information uniquely identifying the BMS component;
determining, by the server, a field agent available to service the component based on at least one of a location of the component and a skill level associated with the fault code;
transmitting, from the server to a user device associated with the field agent, a notification, the notification comprising an instruction to provide a user identification;
receiving, from the user device by the server, the user identification;
verifying the field agent based on the user identification; and
transmitting, from the server to the user device, the service information associated with the BMS component in response to the verification, the service information comprising at least one of service instructions, data sheets, or system information.

11. The method of claim 10, wherein the user device is a smart phone running a mobile application.

12. The method of claim 10, the service information further comprising at least one of a required tools list, a replacement parts list, a complexity level, an estimated time to service, and the location of the BMS component.

13. The method of claim 10, further comprising receiving, from the user device, an acceptance or rejection from the field agent prior to verifying the field agent.

14. A server for use with a system to display product information associated with a building management system (BMS) component, the system comprising a user device, the user device comprising a sensor, the user device configured to:
capture, via the sensor, identifying information, the identifying information uniquely identifying the BMS component;
transmit the identifying information
the server comprising:
a database for storing the product information associated with the BMS component, the server being configured to:
receive the identifying information; and
transmit to the user device the product information associated with the BMS component identified by the identifying information, the product information associated with the BMS component comprising at least one of installation instructions, data sheets, or system information.

15. The server of claim 14, wherein the sensor is a proximity based sensor.

16. The server of claim 15, wherein the proximity based sensor is a near field communication (NFC) circuit configured to communicate with an NFC tag coupled to the BMS component.

17. The server of claim 14, wherein the sensor comprises a camera capable of identifying at least one of a marking, a bar code, and a QR code associated with the BMS component.

18. The server of claim 14, wherein the identifying information is provided to the user device via an identification card.

19. The server of claim 18, wherein the identification card comprises an NFC tag associated with the identification card.

20. The server of claim 14, wherein the identifying information is a personal identification number (PIN).

* * * * *